United States Patent
Knutson et al.

(10) Patent No.: US 12,529,332 B1
(45) Date of Patent: Jan. 20, 2026

(54) GENSET WITH SUPPLEMENTARY LOAD DEVICE

(71) Applicant: Wacker Neuson America Corporation, Menomonee Falls, WI (US)

(72) Inventors: Donovan Knutson, Slinger, WI (US); Vaibhav Munde, Germantown, WI (US); Paul Pribyl, Grafton, WI (US); Lucas Nowicki, Milwaukee, WI (US); Nicholas Phung, Oak Creek, WI (US)

(73) Assignee: Wacker Neuson America Corporation, Menomonee Falls, WI (US)

( * ) Notice: Subject to any disclaimer, the term of this patent is extended or adjusted under 35 U.S.C. 154(b) by 0 days.

(21) Appl. No.: 18/828,515

(22) Filed: Sep. 9, 2024

(51) Int. Cl.
*F02B 63/04* (2006.01)
*F02D 29/06* (2006.01)

(52) U.S. Cl.
CPC ............ *F02B 63/047* (2013.01); *F02D 29/06* (2013.01)

(58) Field of Classification Search
CPC .............................. F02B 63/047; F02D 29/06
See application file for complete search history.

(56) References Cited

U.S. PATENT DOCUMENTS

| 11,015,541 | B2 | 5/2021 | Kido et al. | |
| 2018/0148037 | A1* | 5/2018 | Pursifull | B60W 10/08 |
| 2020/0132570 | A1* | 4/2020 | Lucke | F02D 41/22 |

FOREIGN PATENT DOCUMENTS

WO WO-2019177979 A1 * 9/2019 ............. F02D 29/06

* cited by examiner

*Primary Examiner* — Ngoc T Nguyen
(74) *Attorney, Agent, or Firm* — Boyle Fredrickson, S.C.

(57) ABSTRACT

A genset is equipped with an electrically powered supplemental load device (SLD) that controls an aspect of engine operation. A controller controls the SLD to increase electrical load on the alternator and, thus, increase mechanical load on the engine, if monitored engine load is beneath a threshold. The SLD may comprise an electric engine coolant heater. The engine may be a diesel engine equipped with an exhaust aftertreatment system (ATS). In this case, the load threshold may be one below which at least one component of the ATS does not operate effectively. Engine load may be monitored indirectly by monitoring electrical load on the alternator. If so, the engine load may be considered to be proportional to alternator electrical load. Also disclosed is a method of operating a genset.

19 Claims, 4 Drawing Sheets

GENSET WITH SUPPLEMENTARY LOAD DEVICE

BACKGROUND OF THE INVENTION

1. Field of the Invention

The present invention relates to an electric genset and, more particularly, relates to a genset incorporating measures to impose a load on the genset's engine, in addition to that imposed by meeting the output demand of the genset's alternator, to increase engine load when engine load is beneath a designated threshold.

2. Discussion of the Related Art

Electric power generators, often called "generators" or simply "gensets", are widely used in a number of applications to generate electric power and to supply that power to external loads during power outages. They also are widely used in locations in which the grid is unavailable. Constructions sites are typical of such locations. When used on construction sites, gensets provide electrical power for lighting, power tools, heaters, etc.

The typical genset includes an internal combustion (IC) engine, and an electrical generator or alternator that is powered by the engine and that generates electrical power for supply to one or more external loads. While the terms "generators" and "alternators" are used synonymously in the art, the term "alternator" will be used in most instances herein to help distinguish the component that generates electrical power from the system as a whole. The IC engine typically is fueled by gasoline, diesel fuel, or even a gaseous fuel such as natural gas or propane. The alternator supplies electrical power to external loads, typically via a hard wired connection or a plug and socket connection. The power typically is supplied in the form of an AC current at settable current and voltage.

Alternators work best when operating at a constant speed of, for example, 1,800 RPM when designed to generate power at a constant rate of, for example, 60 Hz. The load imposed on the engine by the alternator depends on the external load's prevailing electrical power demand. This load can vary dramatically. In order to ensure proper alternator operation, the engine must supply sufficient power to drive the alternator at the desired speed under the highest-rated electrical power demand conditions. This sizing requirement can result in very low demand being placed on the engine at times of low electrical power demand.

Some engines are equipped with auxiliary systems that do not work well under low load conditions. For example, diesel engines often are equipped with exhaust gas aftertreatment systems (ATS) that oxidize, burn, filter, or otherwise treat particulates, NOx, and other impurities or pollutants in the engines' exhaust gases. Many such devices do not operate effectively at low engine loads because the engine does not generate sufficient heat when operating under low load conditions to perform the desired aftertreatment.

It thus is desirable to incorporate measures to impose an auxiliary or supplemental load, i.e., a load that is independent to that imposed by the alternator by the prevailing external load, to an engine during periods of low electrical power demand to assure proper operation of exhaust aftertreatment devices and possibly other engine components.

There are other circumstances in which it is desirable to impose a supplemental load on an engine of a genset. For example, the typical engine must warm up to a minimum operating temperature on initial startup before it can supply power to the alternator.

Several techniques have been employed to impose supplemental loads on genset engines. All experience drawbacks.

For example, engines equipped with a belt driven water pump can be controlled to power the water pump to circulate water through the engine's coolant system, thus increasing load on the engine. The drive belt for the typical water pump is connected to an electromagnetic clutch that should be engaged at the lowest reasonable RPM, which is typically the low idle speed of the engine, or about 1,000 RPM for most engines. The engine cannot be slowed to engage the clutch without undesirably reducing the output of the alternator. The clutch therefore must be engaged at undesirably high speeds, with resultant increased wear and tear and early failure of the clutch.

Some gensets are equipped with resistive load banks on the alternator side. These systems artificially impose a load on the alternator during times of low "true" electrical power demand to maintain engine load at acceptable levels. These systems require the use of transformers in order to coordinate the load imposed by load bank with the true load to achieve the desired combined load on the engine. These transformers are expensive and prone to failure. They also generate substantial heat, at the risk of damage to heat sensitive system components or discomfort or even harm to personnel in the vicinity of the genset. Resistive load banks also are useless in accelerating engine warmup on initial startup because the alternator cannot be operated during that warmup period. Resistive heaters sometimes are provided to accelerate engine warmup, but they are used only on initial startup in cold weather, not as supplemental load devices.

The need therefore has arisen to provide an improved technique for imposing a supplemental load on an engine of a genset in order to improve engine operation.

SUMMARY

In accordance with a first aspect of the invention, this need is met by providing a genset that is equipped with an electrically powered supplemental load device (SLD) that controls an aspect of engine operation. A controller controls the SLD to increase electrical load on the alternator and, thus, increase mechanical load on the engine, if monitored engine load is beneath a threshold.

The SLD may comprise an electric engine coolant heater. The controller may be configured to activate the coolant heater when the coolant temperature is beneath a designated threshold. It may also be configured to activate the coolant heater at engine startup.

Engine load may be monitored indirectly by monitoring electrical load on the alternator in recognition of the fact that engine load is proportional to alternator electrical load. For example, a low engine load condition might be a detected if the detected alternator electrical load is a designated percentage of maximum rated alternator electrical load.

The engine may be a diesel engine equipped with an exhaust aftertreatment system (ATS). In this case, the load threshold may be one below which at least one component of the ATS does not operate effectively.

Also disclosed is a method of operating a genset. The method includes operating an IC engine, transferring power from the IC engine to an alternator, generating electricity via operation of the alternator, and supplying the generated electrical power to an external load. The method also responds to low engine load conditions. Specifically, the method additionally includes, using an electronic controller, 1) monitoring engine load, and 2) if the monitored engine load is beneath a designated threshold, activating an electrically powered supplemental load device (SLD) so as to increase electrical load on the alternator and, accordingly, increase mechanical load on the engine, wherein the supplemental load device controls an aspect of engine operation.

The SLD may comprise an electric engine coolant heater. In this case, the method may include activating the coolant heater when the engine load is below the threshold and coolant temperature is beneath a designated threshold.

The engine may be a diesel engine equipped with an exhaust aftertreatment system (ATS). In this case, the threshold is one below which at least one component of the ATS does not operate effectively.

The monitoring may comprise monitoring engine load indirectly by monitoring electrical load on the alternator. In this case, the threshold may be an electrical load threshold, which may be a designated percentage of maximum rated alternator electrical load.

These and various other aspects, advantages, and features of the invention will become apparent to those skilled in the art from the following detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

An exemplary embodiment of the invention is illustrated in the accompanying drawings in which like reference numerals represent like parts throughout, and in which.

DETAILED DESCRIPTION

Figure 1:
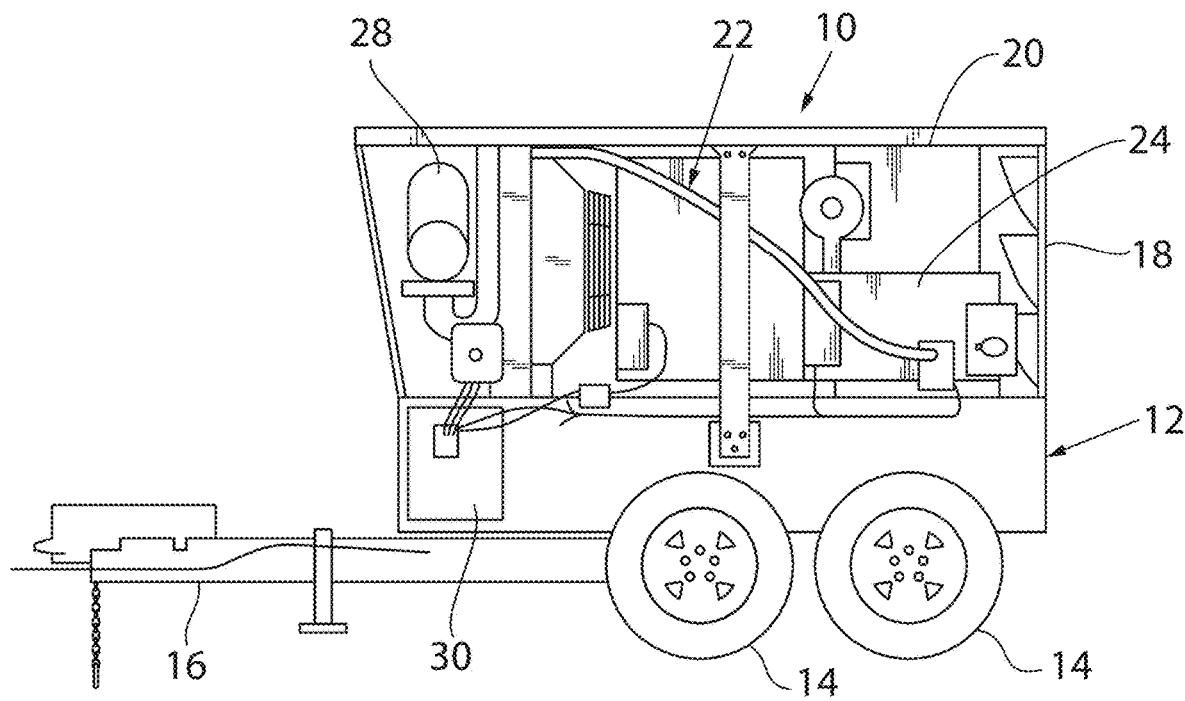
FIG. 1 somewhat schematically illustrates a genset constructed in accordance with an embodiment of the invention.

Referring to the drawings and initially to FIG. 1, an electrical generator or "genset" 10 is illustrated incorporating a supplementary load device constructed in accordance with an embodiment of the present invention. The genset 10 is mounted on a mobile trailer 12 supported on wheels 14 and towed by a hitch 16. The genset 10 is enclosed in a casing 18 and is accessible by doors or panels 20. The genset 10 includes an IC engine 22 and an alternator 24. The alternator 24 receives mechanical power from the engine 22 and generates electrical power for delivery to an external load such as one or more lighting devices, power tools, heaters, etc. The power is typically supplied loads via plug and socket connections (not shown) or, in some cases, hard wiring. In the case of a mobile generator, the external load typically includes one or more of lights, pumps, heaters, power tools, etc.

The alternator 24 typically supplies electrical power in the form of AC power at an output frequency of 60 Hz at any of a number of selectable voltages ranging from 120V to 277V when operated at a standard input velocity of 1800 RPM. The alternator 24 may have a nominal prime power output of 10 kW to 150 KW and, more typically, 10 kW to 40 kW while operating at an output frequency of 60 Hz. It may have a settable output voltage ranging from 120 V to 277 V during single phase operation and from 208 V to 480 V during three phase operation. Of course, different gensets having different power output ratings fall within the scope of the present invention.

Figure 2:
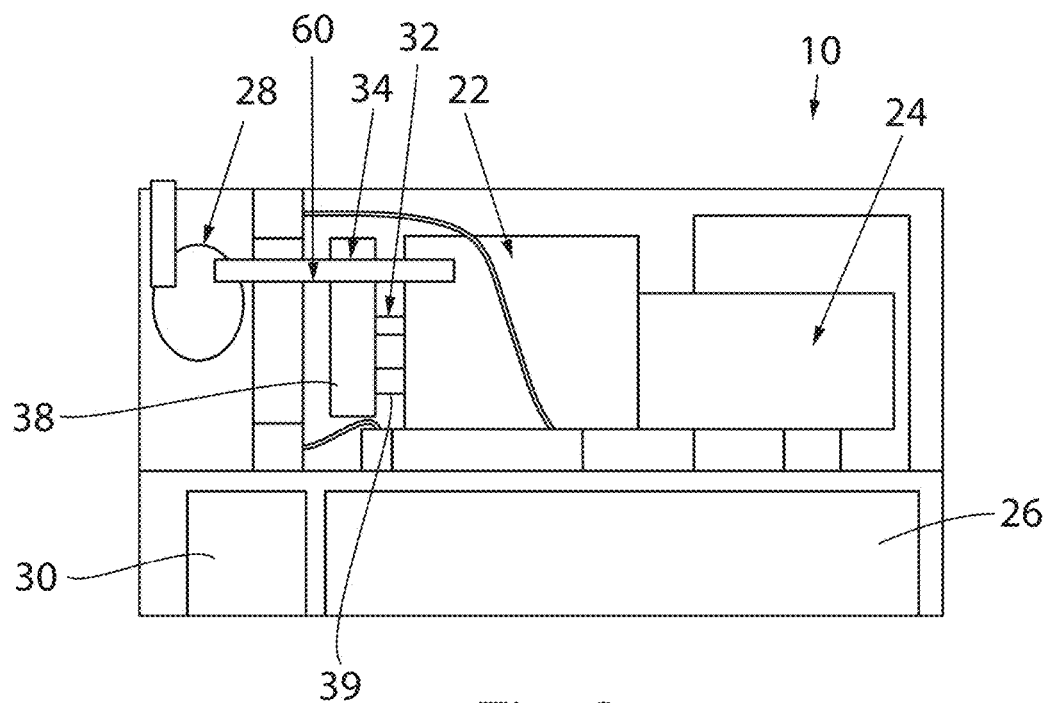
FIG. 2 schematically illustrates the major components of the genset of FIG. 1.

Referring to FIG. 2, the engine 22 is an internal combustion engine having an output that is mechanically coupled to an input of the alternator 24. The engine 22 may be configured to be fueled by any of a number of fuels including diesel, gasoline, or a gaseous fuel such as propane or natural gas. The engine 22 may be equipped with an exhaust aftertreatment system (ATS) system 28.

The alternator 24 receives mechanical power from the engine 22 and generates electric power for supply to one or more external load, typically via sockets to which the loads are connected via plugs.

Still referring to FIG. 2, a suitable engine 22 is a 3 to 6 cylinder diesel engine having a rated power output of 50 to 260 hp (37 kW to 195 kW). Such a diesel engine may be equipped with an ATS 28 to reduce emissions. It is supplied with liquid diesel fuel stored in a tank 26. The ATS 28 may include one or more of a diesel oxidation catalyst (DOC) device, a selective catalytic reduction (SCR) device, a diesel particulate filter (DPF) device, and an ammonia slip catalyst (ASC) device. If the ATS 28 includes a SCR, a diesel exhaust fluid (DEF) tank 30 may be supplied for storing a reducing agent such as urea. The engine 22 additionally is equipped with a coolant system 34. The coolant system 34 typically will include a water jacket 36 (FIG. 3) and a radiator including a cooling fan 38. A mechanical pump 39 may circulate coolant between the water jacket 36 and the radiator. The engine 22 may also be equipped with a supplemental load device SLD 60 that increases the electrical load on the alternator 24 on demand so as to increase the load on the engine 22.

Figure 3:
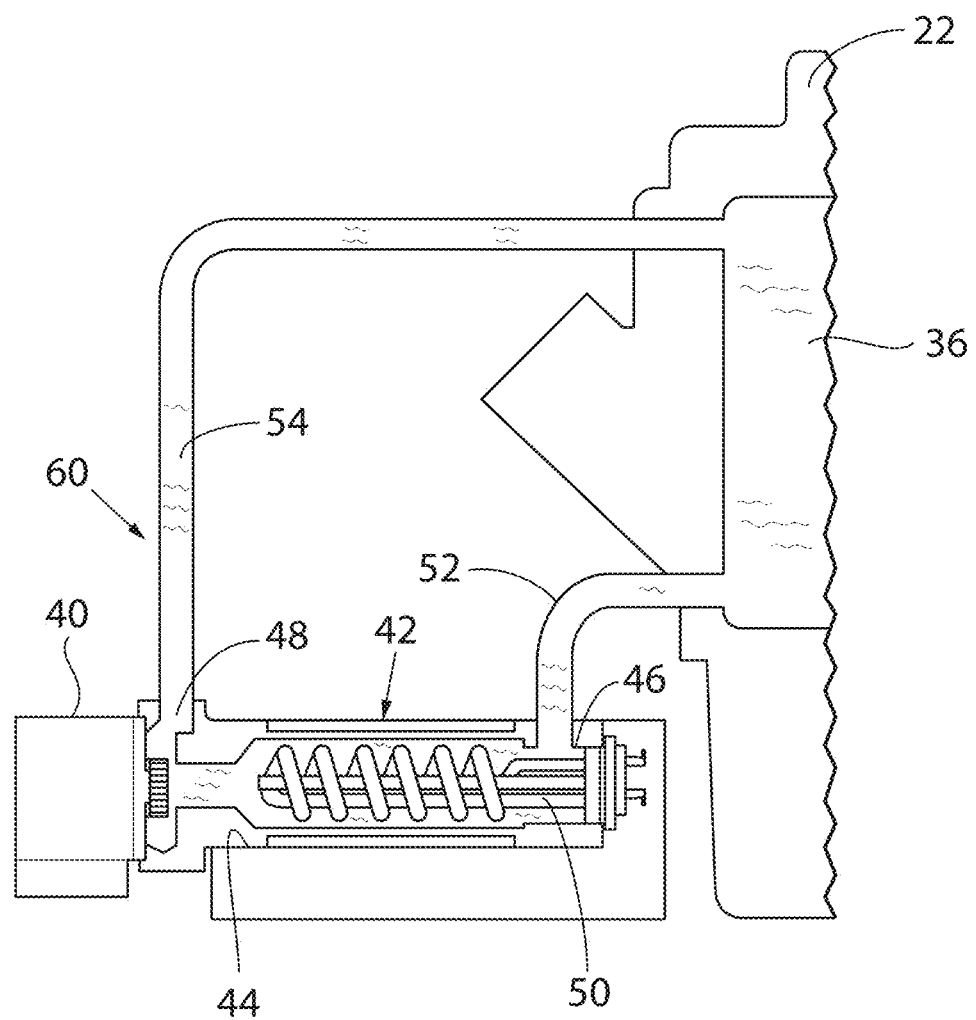
FIG. 3 schematically illustrates a supplemental load device of the genset of FIGS. 1 and 2.

One possible SLD 60 is illustrated in FIG. 3. The SLD 60 includes an electric pump 40 and an electric heater 42 coupled to the water jacket 36. The electric heater 42 heats water flowing through the coolant system 34 (FIG. 1) while imposing an electrical load on the alternator 24. Heater 42 includes a jacket or chamber 44. Chamber 44 has an inlet 46 and an outlet 48 and houses a heating element 50. The heating element 50 includes coils that heat coolant as the coolant flows through the chamber 44 from the inlet 46 to the outlet 48. The pump 40 circulates fluid from the water jacket 36, into the inlet 46 of chamber 44 via a supply line 52, through the chamber 44, out of the outlet 48, and back to the coolant jacket 36 via a return line 54.

In practice, the heater 42 generates the majority of the electric load imposed on the alternator 24 by the SLD 60. The pump 40 is provided primarily to facilitate heat transfer between the heating element 50 and the coolant. In terms of power draw, the heater 42 may provide a power draw of anywhere from 4 kW to 12 kW. Theoretically, heaters of a much lower or higher power draws could be employed to meet the needs of a particular engine. In contract, the pump 40 typically will provide a power draw of on the order of 45-90 W. In fact, in a system with a mechanical coolant pump, the pump 40 may be eliminated entirely, and the pump 39 may be relied upon to circulate fluid through the heater 42—provided that the resulting fluid flow rate is sufficiently high to prevent the heating element 50 from overheating.

The SLD 60 may also include other accessories that may be activated to increase the electrical load on the alternator 24. These accessories may include, but are not limited to, one or more of a fuel filter heater, a battery heater, and lights. However, the load from these devices would generally be too small to have the desired impact on engine load by themselves. Also, activating some of these accessories in high ambient temperatures may be detrimental to the operation of the accessories and/or the alternator 24. Their most typical use in a SLD package would be as adjuncts or supplemental devices to the heater 42 serving as the primary SLD.

Figure 4:
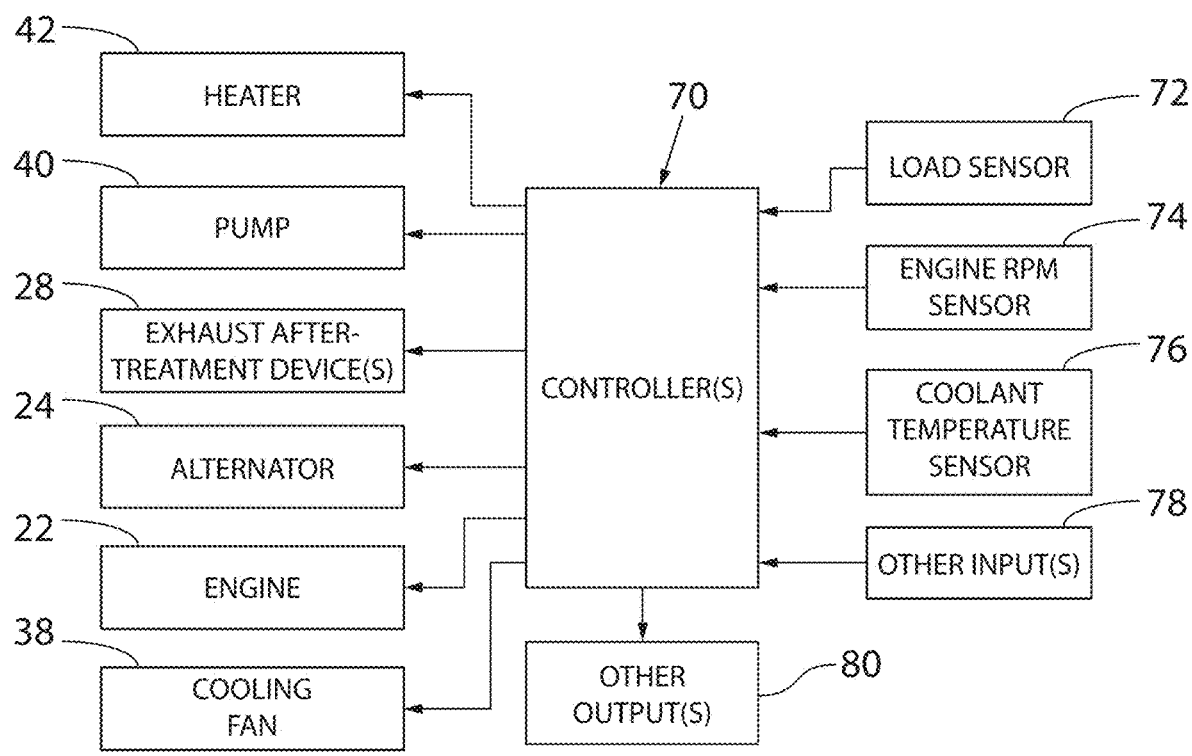
FIG. 4 is an electrical control schematic of the genset of FIGS. 1 and 2.

Turning now to FIG. 4, an electrical control system for the genset 10 is schematically illustrated. At the heart of the system is one or more controller(s) 70. A single controller may be provided for the entire genset 10. More typically, however, separate controllers will be provided for the engine 22, the alternator 24, and possibly even for the ATS 28 and the fan 38. In this case, the individual controllers typically would be connected by broadband communications links such as a CAN Buses to permit data sharing between the controllers and to coordinate control of the controllers' controlled components. The controller for the alternator, typically referred to as a "genset controller", typically would act as the master controller in this case. In any event, each controller typically includes RAM, ROM, and a processor. The term "controller" as used herein should be construed to include systems with any or all of these controllers and/or other controllers.

Still referring to FIG. 4, inputs for the controller 70 include a load sensor 72, an engine RPM sensor 74, and a coolant temperature sensor 76. Other inputs, such as other sensors for monitoring various other aspects of genset operation, as well and manual controls, such as switches for changing power output settings, are collectively shown at 78. The load sensor 72 may monitor engine load as a function of the load on the alternator 24 in recognition of the fact that electrical load on the alternator 24 and mechanical load on the engine 22 are proportional to one another. This load may be monitored in terms of maximum rated electrical power. A low engine load condition typically might be considered between 20% and 40%, more typically 30%, of maximum rated generator load. Alternatively, the actual or raw kW power output of the alternator 24 could be used as an indicator of engine load in place of a percentage. It is also possible to monitor engine load directly, such as a function of maximum rated torque or even maximum rated load. These values would be determined using RPM data from the sensor 74 and other data indicative of engine load.

Still referring to FIG. 4, outputs from the controller 70 include, as controlled components or systems, the heater 42, the pump 40 (if present), the ATS 28, the alternator 24, the engine 22, and the cooling fan 38. Other outputs 80 that may be present collectively include, but are in no way limited to, lights, a battery heater, and status indicators or warning indicators.

Figure 5:
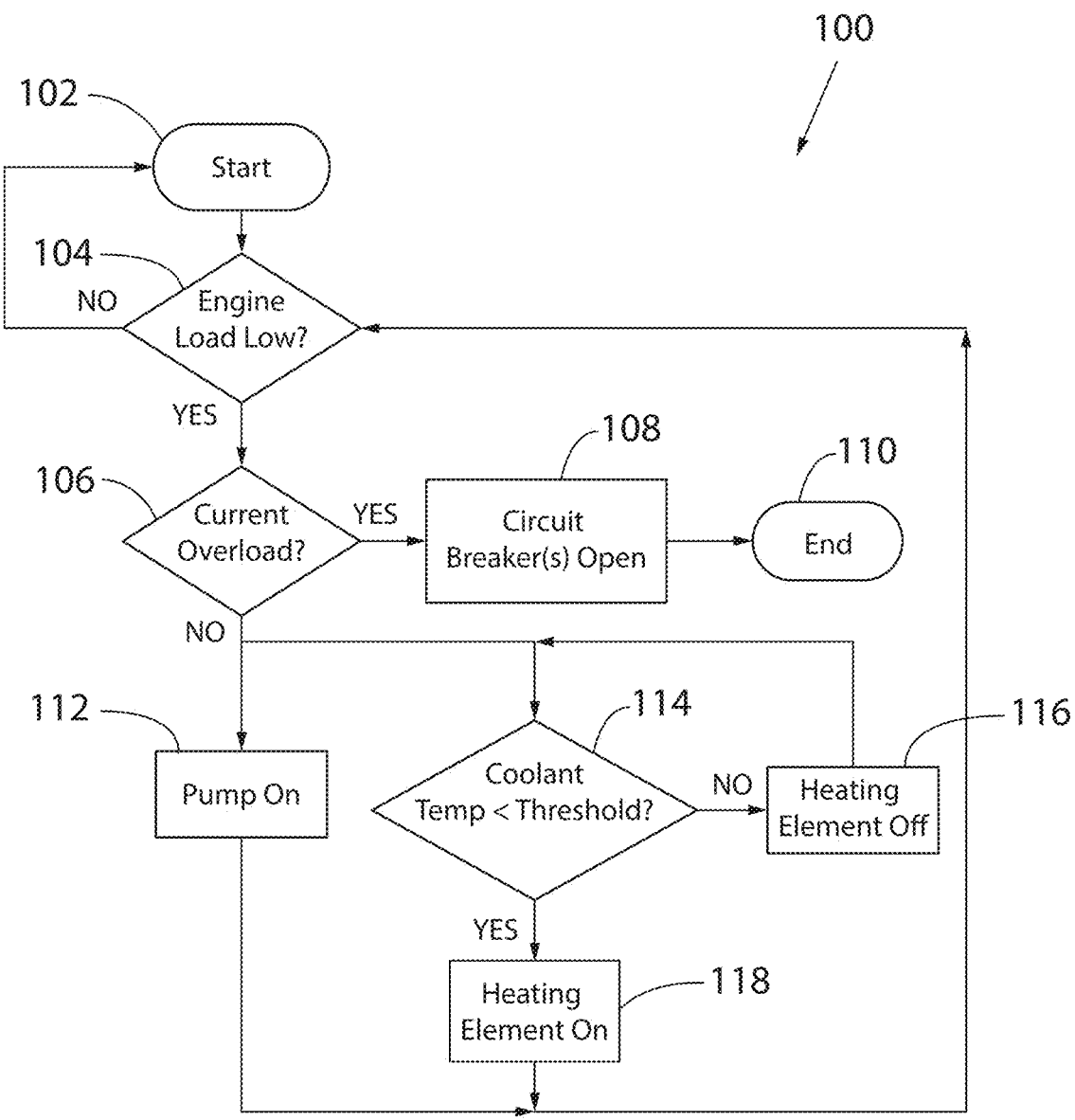
FIG. 5 is a flowchart of a process of controlling the supplemental load device of the genset of FIGS. 1-4.

Referring now to FIG. 5, a process 100 that can be implemented by the controller 70 to control a supplemental load device (SLD) is schematically illustrated. power. If the alternator 24 is operating, the RPM of engine 22 is maintained at 1800 RPM, permitting electrical power generation at the voltages described above. In any event, routine 100 then proceeds from START in Block 102 to Block 104, where it determines whether the engine 22 is operating under a low-load condition. As mentioned above, that determining may be made indirectly based on the determined electrical demand on the alternator as a percentage, such as 30%, of maximum rated electrical power output. A NO determination in block 104 simply results in returning to the beginning of the process at Block 102 without taking action. If the answer to the inquiry of Block 104 is YES, the process 100 activates the SLD 60 to increase engine load. In the present embodiment, the process 100 begings after the engine 22 is started, whether or not the alternator 24 is generating SLD control includes a combination of activation of the pump 40 and the heater 42. As a practical matter, the heater 42 is configured to act as a primary SLD as it draws considerably more power than the pump 40. As mentioned above, the pump 40 may be eliminated entirely in some systems with no appreciable negative impact on SLD operation. In this case, it may be desirable to monitor engine RPM as measured by sensor 74 to make sure that the pump can circulate coolant through the heater 42 at an acceptable rate.

However, the heater 42 cannot be safely activated if the coolant temperature is above a threshold. In the illustrated genset 10, for example, operating at coolant temperatures above 95° C. may cause damage to the pump 40, and operating temperatures above 110° C. may damage the heating coil 50 of the heater 42 or cause the diesel engine 22 to enter a "de-rate" state of function, where the speed and/or torque output is/are reduced until the coolant temp drops back below 110° C. However, the engine's ideal operating temperature under load is 80° C. to 95° C. The typical engine regulator thermostat sets a threshold temperature for engine operation at 80° C. A maximum threshold temperature of 80° C. to 110° would be the most typical maximum threshold temperature for SLD activation.

In addition, SLD control is undesired if the heater 42 or the alternator 24 as a whole experience a circuit overload for any reason. Under these circumstances, it would be preferable to simply disable heater operation, or in the worst case scenario, alternator operation, instead.

A SLD control procedure taking all of these considerations into account is illustrated in Blocks 106-118 in FIG. 5. The process of these Blocks first checks for a current overload condition in Block 106. If such a condition exists, the process 100 proceeds to Block 108 and shuts down at least the heater 42, and possibly the alternator 24 as well, typically by opening circuit breakers. The routine 100 will then send an error message and/or generate an alarm and proceed to End in Block 110. If, on the other hand, no current overload condition exists, the pump 40 will be activated in Block 112 to circulate coolant through the heater 42, and the coolant temperature will be checked in Block 114. If the pump 40 is not employed, the routine 100 will simply proceed directly in Bock 114. If it is determined in Block 114 the coolant temperature is beneath the above described threshold, the heater 42 will be activated in Block 118 to impose the desired current load on the alternator 24 and, thus, the desired mechanical load on the engine 22. Heater operation during initial startup also will accelerate engine warmup and, thus, decrease the waiting period between engine start and generator operation under cold weather operating conditions.

If the answer to the inquiry of Block 114 is NO, the heater 42 will be deactivated in Block 116, and the routine 100 will cycle back to block 112. The pump 40 will remain activated, adding some load to the engine and cooling the electric heater 42. If the pump 40 is omitted, coolant circulation by the engine's existing coolant pump (39 in FIG. 1) may provide the desired coolant circulation through the heater 42 in order to prevent heater overheating.

Whether or not the heater 42 is activated in block 118 or deactivated in Block 116, the routine 100 will return to block 104 to once again determine whether engine load is beneath a threshold. This threshold may be a higher threshold than that which is used in the initial inquiry upon process start in order to build some hysteresis in the system and prevent rapid ON/OFF cycling of the SLD 60. In the present example in which SLD control is activated at 30% of rated maximum electrical power output, SLD deactivation could occur at 60% of rated maximum electrical power output. Variations of 10-20% on either side of that value may be viable. The process 100 then is repeated in a continuous loop.

It should be noted that, in addition to accelerating engine warmup and improving ATS operation, maintaining engine load above a threshold of about 30% of maximum rated alternator output helps reduce wet stacking of a diesel engine, in which unburnt fuel passes through the engine's exhaust system.

Although the best mode contemplated by the inventors of carrying out the present invention, various additions, modifications and rearrangements of the features of the present invention may be made without deviating from the spirit and the scope of the underlying inventive concept.

We claim:

1. A genset comprising:
   (A) an internal combustion engine;
   (B) an electrical alternator that is powered by the engine and that is configured to generate electrical power for supply to an external load;
   (C) an electrically powered supplemental load device that is configured to control an aspect of engine operation; and
   (D) an engine load monitor;
   (E) a controller that is in communication with the engine, the engine load monitor, and the supplemental load device and that is configured to determine whether engine load is beneath a designated threshold and to control the supplemental load device to increase the load on the electrical alternator to increase engine load when engine load is beneath the designated threshold.

2. The genset as recited in claim 1, wherein the supplemental load device comprises an electric engine coolant heater, and wherein the aspect of engine operation is coolant temperature.

3. The genset as recited in claim 2, further comprising an electrically powered pump that pumps coolant through the coolant heater, and wherein the controller is configured to activate the pump when the engine load is below the threshold.

4. The genset as recited in claim 2, wherein the controller is configured to activate the coolant heater when coolant temperature is beneath a designated threshold.

5. The genset as recited in claim 2, wherein the controller is configured to activate the coolant heater at engine startup.

6. The genset as recited in claim 1, wherein the engine is a diesel engine equipped with an exhaust aftertreatment system (ATS), and wherein the threshold is one below which at least one component of the ATS does not operate effectively.

7. The genset as recited in claim 6, wherein the ATS includes at least one of a diesel oxidation catalyst (DOC) device, a selective catalytic reduction (SCR) device, a diesel particulate filter (DPF) device, and an ammonia slip catalyst (ASC) device.

8. The genset as recited in claim 1, wherein the controller monitors engine load indirectly by monitoring alternator electrical load, and wherein the controller determines whether the engine load is beneath the designated threshold by determining whether the generator load is beneath a designated threshold.

9. A genset comprising:
   (A) a diesel engine equipped with an exhaust aftertreatment system (ATS);
   (B) an alternator that is powered by the engine and that is configured to generate electrical power for supply to an external load;
   (C) an electric engine coolant heater which is supplied with electrical power from the alternator;
   (D) an engine load sensor; and
   (E) a controller that is in communication with the engine load sensor, the engine, the alternator, and the coolant heater, wherein the controller is configured to
      a. determine whether a prevailing engine load is beneath a threshold level below which at least one component of the ATS operates effectively, and, if so,
      b. activate the coolant heater to increase electrical load on the alternator and, thus, increase mechanical load on the engine.

10. The genset as recited in claim 9, wherein the controller is configured to activate the coolant heater when the engine load is below the threshold and coolant temperature is beneath a designated threshold.

11. The genset as recited in claim 9, wherein the ATS includes at least one of a diesel oxidation catalyst (DOC) device, a selective catalytic reduction (SCR) device, a diesel particulate filter (DPF) device, and an ammonia slip catalyst (ASC) device.

12. The genset as recited in claim 9, wherein the engine load sensor senses engine load indirectly by sensing alternator electrical load.

13. A method comprising:
   (A) operating an IC engine;
   (B) transferring power from the IC engine to an alternator;
   (C) generating electricity via operation of the alternator and supplying electrical power to an external load; and
   (D) using an electronic controller:
      (1) monitoring engine load;
      (2) if the monitored engine load is beneath a designated threshold, activating an electrically powered supplemental load device so as to increase electrical load on the alternator and, accordingly, increase mechanical load on the engine, wherein the supplemental load device controls an aspect of engine operation.

14. The method as recited in claim 13, wherein the supplemental load device comprises an electric engine coolant heater.

15. The method as recited in claim 14, wherein activating comprises activating the coolant heater when the engine load is below the threshold and coolant temperature is beneath a designated threshold.

16. The method as recited in claim 13, further comprising activating the engine coolant heater at engine startup.

17. The method as recited in claim 13, wherein the engine is a diesel engine equipped with an exhaust aftertreatment system (ATS), and wherein the threshold is one below which at least one component of the ATS does not operate effectively.

18. The method as recited in claim 17, wherein the ATS includes at least one of a diesel oxidation catalyst (DOC)

device, a selective catalytic reduction (SCR) device, a diesel particulate filter (DPF) device, and an ammonia slip catalyst (ASC) device.

19. The method as recited in claim 13, wherein monitoring comprises monitoring engine load indirectly by monitoring electrical load on the alternator, and wherein the designated threshold is a designated alternator load threshold.

\* \* \* \* \*